United States Patent Office 3,256,230
Patented June 14, 1966

---

3,256,230
POLYMERIC WATER AND OIL REPELLENTS
Rulon Edward Johnson, Jr., Newark, and Stuart Raynolds, Wilmington, Del., assignors to E. I. du Pont de Nemours and Company, Wilmington, Del., a corporation of Delaware
No Drawing. Filed May 3, 1961, Ser. No. 107,336
5 Claims. (Cl. 260—29.6)

This invention is directed to the use of mixtures of fluorine containing polymers and non-fluorine containing polymers (i.e. free of non-vinylic fluorine) as water and oil repellents for textiles, paper, leather and the like. The present invention is also related to a process for treating with these mixtures.

Although fluorine containing polymers are readily available, it is well known that they are somewhat expensive. Their expense has been the primary reason for their lack of widespread commercial acceptance.

It is an object of this invention to provide water and oil repellent compositions for textiles, leather, paper and the like which compositions consist of mixtures of fluorine containing compounds and non-fluorine containing compounds (i.e. free of non-vinylic fluorine) where the latter type forms a major proportion of the mixture, which are stable to heat and light, non-discoloring, durable on substrates and in latex form. Another object is to provide a process for treating textiles, paper, leather and the like with these compositions to render them oil and water repellent.

These and other objects will become apparent in the following description and claims.

More specifically, the present invention is directed to a polymeric product comprising from about 3% to about 25% by weight of a polymer prepared from at least one polymerizable fluorine containing aliphatic compound of structure $CH_2=CR^1Q$ and from about 75% to about 97% by weight of a polymer prepared from at least one polymerizable vinyl compound $CH_2=CAB$ chosen from

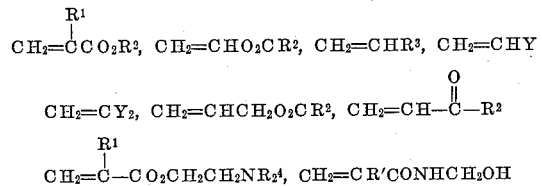

1,3-butadiene, 2-chlorobutadiene, 2,3-dichloro-1,3-butadiene or isoprene, wherein $R^1$ is hydrogen or methyl, $R^2$ is a saturated alkyl group containing from one to 18 carbons, $R^3$ is phenyl or alkyl substituted phenyl, $R^4$ is hydrogen or saturated alkyl groups of one to six carbons, Y is fluorine, chlorine or bromine and Q is $F(CF_2)_nCH_2O_2C-$
and

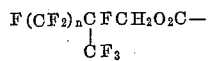

wherein $n$ is an integer of from 3 to about 14; a water dispersion or latex of this composition, and to fabrics or paper treated with this composition to render them oil and water repellent.

Another embodiment of the present invention is a polymeric composition which is a mixture of (a) at least one copolymer comprising from about 25% to about 99% by weight of at least one polymerizable fluorine containing compound

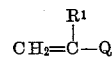

and from 1% to about 75% by weight of at least one polymerizable vinyl compound $CH_2=CAB$ and (b) a polymer prepared from at least one polymerizable vinyl compound $CH_2=CAB$, the weight proportion of said copolymer and said vinyl polymer being such that the mixture contains at least 3% by weight of the component $CH_2=CR^1Q$; a water dispersion or latex of said composition, and fabrics or paper treated with said composition to render them oil and water repellent.

The present invention also relates to a process for treating fibrous materials for the purpose of imparting oil and water repellency thereto which comprises impregnating said fibrous materials with an aqueous bath containing from about 0.3 to about 10% by weight of a composition as heretofore described and, by any convenient means, expressing the excess liquid therefrom to effect a dry pick-up of between 0.3 and 10% on weight of fabric of total solids, said pick-up being equivalent to at least about 0.03% on weight of fabric of the fluorinated monomer, and heating the expressed material at from about 165° C. to about 195° C. for at least 15 seconds.

The alcohols $C_nF_{2n+1}CH_2OH$ do not undergo direct esterification or trans esterification readily. The preferred method of preparing the acrylate and methacrylate esters of these alcohols is by reaction with acrylyl or methacrylyl chloride.

The alcohols $C_nF_{2n+1}CH_2OH$ are well known, being described by Husted and Ahlbrecht in U.S. Patent 2,666,797.

Typical representative examples of useful acrylates and methacrylates are:

1H,1H-perfluorohexyl acrylate and methacrylate
1H,1H-perfluorooctyl acrylate and methacrylate
1H,1H-perfluorodecyl acrylate and methacrylate
1H,1H-perfluorododecyl acrylate and methacrylate The preferred species utilized according to the present invention are 1H,1H-pentadecafluorooctyl methacrylate and 1H,1H-nonadecafluorodecyl methacrylate. The acrylate esters are somewhat less preferred than the methacrylates.

The flourine containing monomers $CH_2=CR^1Q$, as heretofore described contain a polyfluoroalkyl group

$n$ is from 3 to about 14. When $n$ is 1 or 2, good repellencies are not obtained. When $n$ is greater than about 14, the polymeric products become less useful and serve no useful purpose over those containing 14 or less carbons.

The polymerizable vinyl compounds $CH_2=CAB$ which may be used in the practice of this invention include alkyl acrylates and methacrylates, vinyl esters of aliphatic acids, styrene and alkyl styrenes, vinyl halides, vinylidene halides, allyl esters, vinyl alkyl ketones, certain acrylamides and 1,3-butadiene and is derivatives. Typical representative examples include:

Methyl acrylate and methacrylate
Propyl acrylate and methacrylate
Butyl acrylate and methacrylate
Octyl acrylate and methacrylate
Decyl acrylate and methacrylate
Octadecyl acrylate and methacrylate
Lauryl acrylate and methacrylate
Cetyl acrylate and methacrylate
N,N-diethylaminoethyl methacrylate
Acrylic and methacrylic acid
Vinyl acetate, vinyl propionate, vinyl caprylate, vinyl laurate and vinyl stearate
Styrene, α-methylstyrene, p-methyl styrene
Vinyl fluoride, vinyl chloride, vinyl bromide, vinylidene fluoride, vinylidene chloride
Allyl heptanoate, allyl acetate, allyl caprylate, allyl caproate
Vinyl methyl ketone, vinyl ethyl ketone
1,3 - butadiene, 2-chloro-1,3-butadiene, 2,3-dichloro-1,3-butadiene, isoprene
N-methylol acrylamide, and
N-methylol methacrylamide
Isoamyl acrylate and methacrylate
2-ethylhexyl acrylate and methacrylate The preferred class of non-fluorinated monomers (i.e. free of non-vinylic fluorine) is alkyl methacrylates. It is often preferable to include a small amount of N-methylol acrylamide as a copolymer with the alkyl methacrylates since durability is increased thereby. The preferred alkyl methacrylates are n-butyl, n-amyl, isoamyl, n-hexyl, n-heptyl, 2-ethylhexyl and n-octyl methacrylates. Styrene, 2,3-dichloro-1,3-butadiene and alkyl acrylates are also quite useful in the present invention but generally less preferable than the methacrylates.

Esters of acrylic and methacrylic acid are well known and, in many cases, commercially available materials, e.g. methyl, ethyl, butyl, 2-ethylhexyl acrylates and methyl, ethyl, butyl, isobutyl, hexyl, octyl, decyl, lauryl, stearyl, N,N-diethylaminoethyl methacrylates. Most are readily prepared by esterification of the alcohol and acid in the presence of an acid catalyst.

Vinyl acetate, vinyl 2-ethylhexanoate and vinyl stearate are commercially available. The others are readily prepared by reaction of vinyl acetate with the desired acid in the presence of mineral acid or by reaction of the desired acid with acetylene in the presence of a catalyst.

Styrene, alkyl styrenes, butadiene, chlorobutadiene, dichlorobutadiene and isoprene are well known, commercially available compounds. Vinyl and vinylidene halides are also well known and commercially available. Allyl esters are also well known and many are commercially available, e.g. allyl caproate, allyl caprylate, allyl heptanoate, allyl isovalerate and allyl propionate. Methy viny ketone is well known and commercially available. Other alkyl vinyl ketones may be prepared by the reaction of methyl alkyl ketones with formaldehyde in the presence of sulfuric acid. Methylol acrylamide is also commercially available.

The water and oil repellent compositions of this invention comprise a mixture of a fluorine containing polymer and a non-fluorine containing polymer (i.e. free of non-vinylic fluorine). The fluorine containing polymer may consist of one or more fluorine containing monomers or of one or more of the fluorine containing monomers copolymerized with said non-fluorine containing monomer. In the latter case, the polymer consists of 25% to about 99% by weight of the fluorine containing monomers. If the fluorine containing polymer contains less than about 25% by weight of the fluorine containing monomer, poor repellencies (or no repellency) are obtained.

The non-fluorine containing polymer (i.e. free of non-vinylic fluorine) is prepared from one or more of the non-fluorine containing monomers previously described.

It is necessary that the polymer mixture contain at least 3% by weight of the monomer $CH_2=CR^1Q$. At lesser concentrations unsatisfactory repellencies are obtained. The upper limit of 25% placed on $CH_2=CR^1Q$ is determined by economic considerations.

There is a distinct advantage obtained when a small amount of N-methylol acrylamide is included in either the fluorinated or non-fluorinated polymer (i.e. free of non-vinylic fluorine) (or both). The advantage is that the compositions thus obtained are more durable on fabrics than those which do not contain this compound.

The molecular weight of both the fluorinated and said non-fluorinated polymers is not a controlling factor as useful repellents are obtained over a wide range of molecular weights of both types of polymers.

It should be noted that the fluorine containing monomers herein described do not have fluorine attached to the carbon atoms of the polymerizable vinyl group but only in the groups attached to the vinyl group. For the purposes of this invention, monomers containing fluorine attached only to the carbons of the vinyl group (e.g. vinyl fluoride and vinylidene fluoride) are not considered to be fluorine containing monomers.

In the practice of this invention, the fluorine containing monomer and said non-fluorine containing monomer are polymerized separately, generally by an emulsion polymerization technique. The latexes of the fluorine containing polymer and said non-fluorine containing polymer are then mixed together in the desired proportions and applied to the substrate. In the practice of another embodiment as heretofore described, the fluorinated and said non-fluorinated monomers are copolymerized and resulting latex is mixed with a non-fluorinated polymer (i.e. free of non-vinylic fluorine) latex in the desired proportions.

In general, the compositions of this invention may be prepared by any of the known techniques for emulsion polymerization of vinyl compounds. The process will be carried out in a reaction vessel fitted with a stirrer and external means of either heating or cooling the charge. The monomer or monomers to be polymerized together is emulsified in a water solution of a surface active agent to a given emulsion concentration of from about 5% to about 50%. Usually the temperature is raised to between 40° C. and 70° C. to effect polymerization in the presence of an added catalyst. A suitable catalyst may be any one of the commonly known agents for initiating the polymerization of an ethylenically unsaturated compound. These include benzoyl peroxide, lauroyl peroxide, tert-butyl perbenzoate, 1-hydroxycyclohexyl hydroperoxide, tert-butyl peroxide, tert-butyl hydroperoxide, 3-carboxy-propionyl peroxide, acetyl peroxide, 2,2'-azodiisobutyr-amidine dihydrochloride, 2,2'-azodiisobutyronitrile, 2,2-azobis(2,4-dimethyl-4-methoxyvaleronitrile), sodium peroxide, barium peroxide, hydrogen peroxide, ammonium persulfate, potassium persulfate and the like. The concentration of the catalyst for the polymerization is usually between 0.018% and about 2% based on the weight of the monomers. The surface active agents employed to stabilize the emulsion during its makeup and polymerization are anionic, cationic, or non-ionic emulsifying agents, but preferably they are the cationic or non-ionic type. Representative anionic emulsifying agents are alkyl ($C_{10}$ to $C_{18}$) sodium sulfate, sodium alkyl ($C_{12}$ to $C_{18}$) benzene-sulfonate, sodium alkylnaphthalenesulfonate, the sodium salt of sulfated alkenyl ($C_{16}$ to $C_{18}$) acetate, sodium oleate, the sodium salt of sulfated methyl oleate, ammonium ω-H-polyfluoroalkanoate ($C_8$ to $C_{10}$), ammonium perfluoroalkanoate. The cationic agents that may be employed include dodecyltrimethylammonium acetate, trimethyl-tetradecylammonium chloride, hexadecyltrimethylammonium bromide, trimethyloctadecylammonium chloride, (dodecylmethylbenzyl)trimethylammonium chloride, benzyldodecyldimethylammonium chloride, N-[2-(diethylamino)ethyl]oleamide hydrochloride. Non-ionic surface active agents that may be employed include condensation products of ethylene oxide with hexylphenol, isooctyl-phenol, hexadecanol, oleic acid, alkane ($C_{12}$–$C_{16}$) thiol, alkyl ($C_{12}$–$C_{18}$) amines and the like. In addition, small amounts of chain transfer agents may be present during the polymerization, such as, for example, an alkanethiol of 4 to 12 carbon atoms.

Suitable substrates for the application of the compositions produced according to the present invention are films, fibers, yarns, fabrics, and articles made from filaments, fibers, or yarns derived from natural, modified natural, or synthetic polymeric materials or from blends of these. Specific examples are cotton, silk, regenerated cellulose, nylon, fiber-forming linear polyesters, fiber-forming polyacrylonitrile, cellulose nitrate, cellulose acetate, ethyl cellulose, paper, fiber glass and the like. Dyed and undyed cotton sateen, poplin, broadcloth, jean cloth, gabardine and the like are especially adaptable for treatment with the compositions of this invention to provide products having a high repellency to oil and water and being relatively unaffected by the action of heat, air and light. Materials rendered oil and water repellent by the invention polymer compositions retain a portion of the original repellent when laundered and dry cleaned.

These compositions are applied, preferably as an aqueous dispersion, by brushing, dipping, spraying, padding, roll-coating or by any combination of these methods. For example, the prepared concentrated dispersion of polymer composition may be used as a pad bath by diluting it with water to a solids content of 1% to 10% by weight of the bath. The textile material, or paper if desired, is padded in this bath, and is then freed of excess liquid, usually by squeeze rolls, so that the dry pickup (weight of the dry polymer on fiber) is between about 0.3% and 10% by weight of the fiber. The treated material is then heated at 165° to 195° C. for at least about 15 seconds to impart maximum repellency and durability of the agent on the material. The resulting textile material or paper will be found to be resistant to water and oil, and the textile material will retain its resistance to such agents even after many launderings and dry cleanings. The polymers may, if desired, be dispersed in liquids other than water.

Other methods for applying the compositions include the use of solutions in place of dispersions and stepwise deposition of the two polymers. Application from solution is carried out in the same ways, in general, as the application of dispersions. Stepwise application involves deposition of the two polymers separately, usually the non-fluorinated polymer (i.e. free of non-vinylic fluorine) first. Each polymer may be applied either as a dispersion or solution by any of the means described and a curing step may be used after both steps, if desired. The cure after the second application is necessary.

Representative examples illustrating the present invention follow. All parts are by weight.

EXAMPLE 1

A reactor fitted with a stirrer, reflux condenser and two addition funnels was charged with 40 parts of 1H,1H-heptafluorobutyl alcohol, 35 parts of anhydrous ether and 0.1 part of phenothiazine. 22 parts of trimethylamine and 35 parts of anhydrous ether were charged into one funnel and 23 parts of methacrylyl chloride and 35 parts of ether into the other. Stirring was started and the solutions from the two funnels were added slowly and at about the same rate to the mixture in the reactor. The addition was complete in about one hour; stirring was then continued for three additional hours. Triethylamine hydrochloride was then collected by filtration and the filtrate was washed with water. After drying over magnesium sulfate, the ether was removed and the residue distilled, giving 28.7 parts (85% yield) of 1H,1H-heptafluorobutyl methacrylate, $CF_3CF_2CF_2CH_2O_2CC(CH_3)=CH_2$, B.P. 55–56° C./30 mm., $n_D^{25}$ 1.3420.

*Analysis.*—Calcd. for $C_8F_7H_7O_2$: C, 35.8; H, 2.6; F, 49.6. Found: C, 36.0; H, 2.8; F, 50.0

Using the same procedure, the following other esters were prepared:

$CF_3(CF_2)_6CH_2O_2CC(CH_3)=CH_2$, B.P. 78–81° C./8.0 mm.

$CF_3(CF_2)_6CH_2O_2CCH=CH_2$, B.P. 64–65° C./6.0 mm., $n_D^{25}$ 1.3259.

$CF_3(CF_2)_2CH_2O_2CCH=CH_2$, B.P. 63–64° C./105 mm., $n_D^{25}$ 1.3312.

EXAMPLE 2

A vessel equipped with an agitator, thermometer and reflux condenser was charged with the following ingredients in the order given:

| | Parts |
|---|---|
| Water | 30 |
| Trimethyloctadecyl ammonium bromide | 1 |
| 1H,1H-pentadecafluorooctyl methacrylate | 10 |
| Acetone | 5 |
| 2,2'-azobisisobutyramidine dihydrochloride | 0.2 |

The water, ammonium salt, methacrylate mixture was purged with nitrogen before addition of acetone and catalyst.

The monomer readily emulsified in the water solution. The charge was heated at 65° C. for six hours under a mild flow of nitrogen. The solids content of the resulting latex was 21.3%.

Essentially the same procedure is used to prepare the polymers (fluorinated and non-fluorinated) described and used in the following examples as well as the useful fluorinated and non-fluorinated monomers previously listed.

EXAMPLE 3

Latexes of poly(1H,1H-pentadecafluorooctyl methacrylate) and poly(n-octyl methacrylate) were mixed and diluted in several proportions to obtain latexes containing several concentrations of total solids with several percentage concentrations of fluorinated polymer each. Samples of cotton poplin fabric were then padded with the various latexes to obtain 100% wet pickup. The samples were then air dried for at least 45 minutes, then oven cured for 2 to 3 minutes at 175° C.

The samples were tested for water repellency according to AATCC Standard Test Method 22–1952 of the American Association of Textile Chemists and Colourists. A rating of 100 indicates no water penetration or surface adhesion. A rating of 90 denotes slight random sticking or wetting on the fabric. A rating of 50 is still somewhat water repellent while a rating of zero indicates complete penetration and wetting.

Oil repellency is tested by placing a drop of the test mixture gently on the surface of the treated fabric sample on a flat, horizontal surface. After two minutes, penetration or wicking into the fabric is observed visually. The test solutions have the compositions shown below in Table I and contain a small amount of oil soluble blue dye for sake of visibility. The oil repellency rating is the highest number test solution which does not penetrate the fabric, e.g. if the fabric is penetrated by No. 7 solution but not by No. 1–6, the rating is 6. A fabric penetrated by No. 1 solution is rated as zero.

Obviously the higher the number, the greater the resistance to oil penetration. Any repellency greater than zero will repel most oils. Tables I and II which follow are illustrative.

Table I

| Oil Repellency Rating | Solution | Surface Tension, dynes/cm. at 25° C. |
|---|---|---|
| 9 | n-Hexane | 19.2 |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | 50–50 Hexadecane-Nujol | 28.7 |
| 1 | Nujol | 31.2 |

The results obtained with this series of tests are shown below.

Table II

| Composition Percent Poly-(C$_7$F$_{15}$CH$_2$O$_2$CC(CH$_3$)=CH$_2$) OWPS $^a$ | Repellency | | | | | | | |
|---|---|---|---|---|---|---|---|---|
| | Loading 3% OWF $^b$ | | 2% | | 1% | | 0.5% | |
| | Oil | Water | Oil | Water | Oil | Water | Oil | Water |
| 20 | 7 | 100 | 7 | 100 | 7 | 100 | 6 | 100 |
| 15 | 7 | 100 | 7 | 100 | 7 | 100 | 6 | 100 |
| 10 | 7 | 100 | 7 | 100 | 7 | 100 | 6 | 90+ |
| 7 | 7 | 100 | 7 | 100 | 7 | 90 | 2 | 90+ |
| 5 | 7 | 100 | 7 | 90 | 3 | 90 | 1 | 70 |
| 4 | 7 | 90 | 7 | 70 | 2 | 70 | 1 | 50 |
| 3 | 7 | 70 | 2 | 50 | 2 | 50 | 1 | 50 |
| 2 | 3 | 50 | 1 | 50 | 1 | 50 | 1 | 50 |
| 1 | 1 | 50 | 1 | 50 | 0 | 50 | 0 | 50 |
| 0 | 0 | 50 | 0 | 50 | 0 | 50 | 0 | 50 |

$^a$ OWPS = on weight of total polymer solids.
$^b$ OWF = on weight of fabric.

These results indicate that 3% fluorinated polymer in the polymer mixture and about 0.1% of fluorinated polymer on the fabric are necessary.

EXAMPLE 4

A 3% latex of 2,3-dichlorobutadiene was applied to samples of cotton fabric (100% wet pick-up), dried and cured for 3 minutes at 175° C. These samples were then treated with 0.45% and 0.09% latexes of poly(1H,1H-pentadecafluorooctyl acrylate) and poly(1H,1H-pentadecafluorooctyl methacrylate) as previously described with the results shown below.

| Percent Fluorinated Polymer OWF | Poly($C_7F_{15}CH_2O_2CCH=CH_2$) | | Poly($C_7F_{15}CH_2O_2CC(CH_3)=CH_2$) | |
|---|---|---|---|---|
| | Oil | Water | Oil | Water |
| 0.45 | 6 | 90 | 7 | 100 |
| 0.09 | 3 | 50 | 6 | 100 |

EXAMPLE 5

Four samples of cotton fabric were treated with a 3% latex of poly(n-octyl methacrylate) as previously described. Samples of poly(1H,1H-pentadecafluorooctyl acrylate) and poly (1H, 1H-pentadecafluorooctyl methacrylate) were dissolved in a mixture of equal volumes of benzotrifluoride and 1,3-bis(trifluoromethyl(benzene and 0.6% and 0.2% concentrations. The cotton fabric samples prepared above were padded with these solutions in the same manner as the aqueous dispersions previously described. After curing as before, the following repellencies were observed.

The marked superiority of the polymer mixtures over the copolymers is apparent from Table III. The copolymers shown in Table III are not improved by dilution with another non-fluorinated polymer.

EXAMPLES 7 TO 25

Other polymer and copolymer mixtures were prepared, applied and tested as previously described. The results are shown in Table IV.

In the same manner as the above examples, polymers and copolymers of the other useful fluorine containing monomers previously described can be mixed with polymers of the useful vinyl monomers previously described

| Percent Fluorinated Polymer OWF | Poly($C_7F_{15}CH_2O_2CCH=CH_2$) | | Poly($C_7F_{15}CH_2O_2CC(CH_3)=CH_2$) | |
|---|---|---|---|---|
| | Oil | Water | Oil | Water |
| 0.6 | 3 | 50 | 6 | 70 |
| 0.2 | 3 | 50 | 6 | 70 |

EXAMPLE 6

Various polymers and copolymers were prepared using the technique of Example 1. The resulting latexes were diluted or mixed and diluted, then applied to cotton poplin as described in Example 2. The results obtained using copolymers and polymer mixtures containing the same concentration of fluorinated monomers are shown in Table III.

and applied to textiles with comparable results. The same method of application, in principle, is used for application to leather and the like. For application to paper, the compositions may be applied in the same manner as to textiles or, more conveniently, the composition may be added to the beater stock wherein it becomes incorporated into the paper; the usual drying step of paper manufacture being sufficient to cure the polymer composition to the paper.

*Table III*

COTTON POPLIN SUBSTRATE

| Mixed Polymers $CH_2=CAB$[a] Mixed and Copolymers | Percent (wt.) Poly($CH=CR^1Q$)[b] OWPS[c] | Repellency | | | | Copolymers Composition Percent F | Percent Poly-($CH_2=CR^1Q$) | Repellency | | | |
|---|---|---|---|---|---|---|---|---|---|---|---|
| | | 3% (tot. solids OWF)[c] | | 1% (OWF)[c] | | | | 3% (OWF)[c] | | 1% (OWF)[c] | |
| | | Oil | Water | Oil | Water | | | Oil | Water | Oil | Water |
| 2,3-dichlorobutadiene | 10 | 7 | 100 | 3 | 80 | 4.4 | 7.2 | 0 | 0 | 0 | 0 |
| | 5 | 7 | 90 | 2 | 70 | | | | | | |
| 2-chlorobutadiene | 10 | 7 | 100 | 7 | 100 | 6.45 | 10.6 | 2 | 50 | 2 | 50 |
| Styrene | 15 | 6 | 100 | 5 | 100 | 7.5 | 12.3 | 0 | 0 | 0 | 0 |
| | 10 | 6 | 100 | 5 | 100 | | | | | | |
| n-Butylacrylate | 10 | 7 | 50 | 7 | 50 | 6.1 | 10.0 | 1 | 0 | 1 | 0 |
| n-Octyl methacrylate | 10 | 7 | 100 | 7 | 100 | 6.2 | 10.1 | 1 | 0 | 1 | 0 |
| n-Lauryl methacrylate | 10 | 7 | 70 | 6 | 70 | 6.1 | 10.0 | 1 | 0 | 1 | 0 |
| Isoamyl methacrylate | 10 | 5 | 100 | 2 | 100 | 6.1 | 10.0 | 0 | 0 | 0 | 0 |
| 2-(n-butoxy)ethyl methacrylate | 10 | 6 | 90 | 2 | 80 | 6.2 | 10.1 | 0 | 0 | 0 | 0 |

[a] Vinyl monomer used to prepare mixture of polymers and copolymer.
[b] Fluorine containing monomer, 1H, 1H-pentadecafluorooctyl methacrylate throughout.
[c] Total solids (OWF), percent (wt.) of solids, polymer mixture or copolymer on fabric based on the weight of fabric. OWPS: Percent fluorinated polymer on weight of total polymer solids.

3,256,230

Table IV

| Ex. No. | Fluorinated Polymer Monomer | Non-Fluorinated Polymer Monomer(s) | Loading percent OWF[a] | 20 Oil | 20 Water | 15 Oil | 15 Water | 10 Oil | 10 Water | 7 Oil | 7 Water | 5 Oil | 5 Water |
|---|---|---|---|---|---|---|---|---|---|---|---|---|---|
| 7 | $C_7F_{15}CH_2O_2CC(CH_3)=CH_2$ | $C_6H_{13}O_2CC(CH_3)=CH_2$ | 3<br>2<br>1<br>0.5 | 7<br>7<br>7<br>4 | 100<br>100<br>100<br>100 | 7<br>7<br>6<br>2 | 100<br>100<br>100<br>100 | 7<br>7<br>5<br>1 | 100<br>100<br>100<br>100 | 7<br>7<br>2<br>1 | 100<br>100<br>100<br>80 | 7<br>2<br>1<br>0 | 100<br>90<br>90<br>70 |
| 8 | $C_7F_{15}CH_2O_2CCH=CH_2$ | $C_8H_{17}O_2CC(CH_3)=CH_2$ | 3<br>1 | 6<br>4 | 50<br>50 | 5<br>3 | 50<br>50 | 5<br>2 | 50<br>50 | 4<br>2 | 50<br>50 | 3<br>1 | 50<br>50 |
| 9 | $C_7F_{15}CH_2O_2CCH=CH_2$ 5%[c]<br>$C_7F_{15}CH_2O_2CC(CH_3)=CH_2$ 50% | $CH_2=CCl-CH=CH_2$ | 3<br>1 | 6<br>6 | 70<br>70 | 6<br>6 | 70<br>70 | 6<br>6 | 70<br>70 | 6<br>5 | 70<br>70 | 6<br>2 | 70<br>70 |
| 10 | $C_7F_{15}CH_2O_2CCH=CH_2$ 50%[c]<br>$C_7F_{15}CH_2O_2CC(CH_3)=CH_2$ 50% | $C_8H_{17}O_2CC(CH_3)=CH_2$ | 3<br>1 | 7<br>6 | 90<br>80 | 7<br>6 | 90<br>80 | 7<br>5 | 90<br>80 | 7<br>4 | 80<br>70 | 6<br>2 | 70<br>50 |
| 11 | $C_8F_{17}SO_2NCH_2CH_2O_2CCH=CH_2$[c] 50%<br>$nC_3H_7$<br>$CH_2=CH-CCl=CH_2$ 50% | $C_8H_{17}O_2CC(CH_3)=CH_2$ | 3 | 7 | 70 | 7 | 70 | 7 | 50 | 7 | 50 | 5 | 50 |
| 12 | $C_7F_{15}CH_2O_2CC(CH_3)=CH_2$ 99%[c]<br>$CH_2=CHCONHCH_2OH$ 1% | $C_8H_{17}O_2CC(CH_3)=CH_2$ | 1 | 5 | 70 | 5 | 50 | 4 | 50 | 3 | 50 | 1 | 50 |
| 13 | $C_7F_{15}CH_2O_2CC(CH_3)=CH_2$ 98%[c]<br>$CH_2=CHCONHCH_2OH$ 2% | $C_8H_{17}O_2CC(CH_3)=CH_2$ | 3<br>1 | 7<br>7 | 100<br>90 | 7<br>7 | 90<br>80 | 7<br>4 | 80<br>70 | 7<br>2 | 70<br>50 | 5<br>1 | 70<br>50 |
| 14 | $C_7F_{15}CH_2O_2CC(CH_3)=CH_2$ | $C_8H_{17}O_2CC(CH_3)=CH_2$ 99%[c]<br>$CH_2=CHCONHCH_2OH$ 1% | 3<br>1 | 7<br>7 | 100<br>100 | 7<br>5 | 100<br>100 | 7<br>2 | 100<br>90 | 7<br>1 | 90<br>70 | 4<br>1 | 70<br>50 |
| 15 | $C_7F_{15}CH_2O_2CC(CH_3)=CH_2$ | $C_8H_{17}O_2CC(CH_3)=CH_2$ 98%[c]<br>$CH_2=CHCONHCH_2OH$ 2% | 3<br>1 | 7<br>7 | 100<br>100 | 7<br>7 | 100<br>100 | 7<br>7 | 100<br>90 | 7<br>5 | 90<br>80 | 7<br>2 | 90<br>80 |
| 16 | Same as 12 | Same as 14 | 3<br>1 | 7<br>6 | 100<br>100 | 7<br>6 | 100<br>100 | 7<br>5 | 100<br>100 | 7<br>4 | 100<br>90 | 7<br>3 | 100<br>90 |
| 17 | Same as 13 | Same as 15 | 3<br>1 | 7<br>5 | 90<br>80 | 7<br>5 | 80<br>80 | 7<br>3 | 80<br>70 | 5<br>2 | 70<br>50 | 2<br>1 | 50<br>50 |
| 18 | $C_7F_{15}CH_2O_2CC(CH_3)=CH_2$ | None | 0.6<br>0.2 | 4<br>1 | 100<br>100 | 7<br>7 | 100<br>90 | 7<br>3 | 80<br>70 | 6<br>2 | 70<br>70 | 3<br>1 | 50<br>50 |
| 19 | $C_7F_{15}CH_2O_2CCH=CH_2$ | ....do.... | 0.6<br>0.2 | 6<br>4 | 70<br>70 | 100% Fluorinated polymer OWPS | 100% Fluorinated polymer OWPS | | | | | | |
| 20 | $C_7F_{15}CH_2O_2CC(CH_3)=CH_2$ | $(CH_3)_2CH(CH_2)_2O_2CC(CH_3)=CH_2$ 50%<br>$C_{12}H_{25}O_2CC(CH_3)=CH_2$ 50% | 3<br>1 | 7<br>7 | 100<br>100 | 7<br>7 | 100<br>100 | 7<br>3 | 100<br>90 | 7<br>2 | 100<br>70 | 6<br>1 | 80<br>60 |
| 21 | $C_7F_{15}CH_2O_2CC(CH_3)=CH_2$ | $C_{18}H_{37}O_2CC(CH_3)=CH_2$ 70%[c]<br>$(C_2H_5)_2NCH_2CH_2O_2CC(CH_3)=CH_2$[c] 30% | 3<br>1 | 3<br>1 | 80<br>70 | 3<br>1 | 80<br>70 | 3<br>1 | 80<br>50 | 1<br>1 | 70<br>50 | 1<br>1 | 70<br>50 |
| 22 | $C_7F_{15}CH_2O_2CCH=CH_2$[c] | $C_8H_{17}O_2CC(CH_3)=CH_2$ | 3<br>1 | 6<br>6 | 80<br>80 | 6<br>6 | 80<br>80 | 6<br>6 | 80<br>80 | 6<br>6 | 80<br>80 | 5<br>5 | 80<br>80 |
| 23 | $C_7F_{15}CH_2O_2CC(CH_3)=CH_2$[c] | $C_8H_{17}O_2CC(CH_3)=CH_2$ | 3<br>1 | 6<br>6 | 90<br>90 | 5<br>5 | 90<br>90 | 5<br>4 | 90<br>90 | 5<br>4 | 90<br>90 | 4<br>4 | 90<br>90 |
| 24 | $C_7F_{15}CH_2O_2CCH=CH_2$[f] | $C_8H_{17}O_2CC(CH_3)=CH_2$ | 3<br>1 | 6<br>4 | 80<br>80 | 6<br>4 | 80<br>70 | 6<br>3 | 70<br>70 | 5<br>3 | 70<br>70 | 3<br>2 | 70<br>70 |
| 25 | $C_7F_{15}CH_2O_2CC(CH_3)=CH_2$[f] | $C_8H_{17}O_2CC(CH_3)=CH_2$ | 3<br>1 | 6<br>6 | 90<br>90 | 6<br>6 | 90<br>90 | 5<br>5 | 90<br>90 | 6<br>6 | 90<br>80 | 5<br>4 | 80<br>70 |

[a] OWT=On weight of fabric. [b] OWPS=On weight of polymer solids. [c] Copolymer. [d] Mixture of homopolymers. [e] On wool serge. [f] On polyethylene terephthalate.

The preceding examplpes are representative and may be varied within the scope of the total specification disclosure to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A polymeric product comprising (1) from about 3% to about 25% by weight of a polymer prepared from at least one polymerizable fluorine containing aliphatic compound of structure $CH_2=CR^1Q$ and (2) from about 75% to about 97% by weight of a polymer prepared from at least one polymerizable vinyl compound $CH_2=CAB$ chosen from the group consisting of $$CH_2=\overset{R^1}{\underset{|}{C}}CO_2R^2,\ CH_2=CHO_2CR^2,\ CH_2=CHR^3,\ CH_2=CHY$$

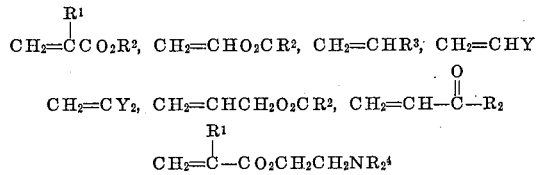

$$CH_2=\overset{R^1}{\underset{|}{C}}CO_2CH_2CH_2NR_2^4$$

1,3-butadiene, 2-chlorobutadiene, 2,3-dichloro-1,3-butadiene and isoprene, wherein $R^1$ is selected from the group consisting of hydrogen and methyl, $R^2$ is a saturated alkyl group containing from one to 18 carbons, $R^3$ is selected from the group consisting of phenyl and alkyl substituted phenyl, $R^4$ is selected from the group consisting of hydrogen and a saturated alkyl group of one to six carbons, Y is selected from the group consisting of fluorine, chlorine and bromine and Q is selected from the group consisting of $F(CF_2)_nCH_2O_2C-$ and

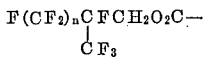

wherein $n$ is an integer of from 3 to about 14.

2. A water dispersion of a composition according to claim 1.

3. A process for treating fibrous materials for the purpose of imparting oil and water repellency thereto which comprises impregnating said fibrous materials with an aqueous bath containing from about 0.3 to about 10% by weight of a composition according to claim 1 and, by any convenient means, expressing the excess liquid therefrom to effect a dry pick-up of between 0.3 and 10% on weight of fabric of total solids, said pick-up being equivalent to at least about 0.03% on weight of fabric of the fluorinated monomer, and heating the expressed material at from about 165° C. to about 195° C. for at least 15 seconds.

4. A polymeric composition which is a mixture of (a) at least one copolymer comprising from about 25% to about 99% by weight of at least one polymerizable fluorine containing compound

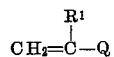

and from 1% to about 75% by weight of at least one polymerizable vinyl compound $CH_2=CAB$ chosen from the group consisting of $$CH_2=\overset{R^1}{\underset{|}{C}}CO_2R^2,\ CH_2=CHO_2CR^2,\ CH_2=CHR^3$$

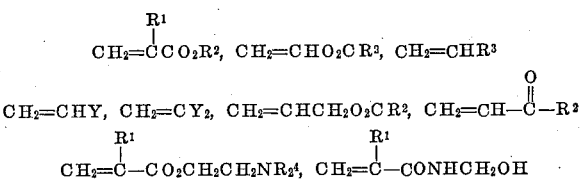

1,3-butadiene, 2-chlorobutadiene, 2,3-dichloro-1,3-butadiene and isoprene, and (b) a polymer prepared from at least one polymerizable vinyl compound $CH_2=CAB$, the weight proportion of said copolymer and said vinyl polymer being such that the mixture contains at least 3% by weight of the component $CH_2=CR^1Q$, wherein $R^1$ is selected from the group consisting of hydrogen and methyl, $R^2$ is a saturated alkyl group containing fom one to 18 carbons, $R^3$ is selected from the group consisting of phenyl and alkyl substituted phenyl, $R^4$ is selected from the group consisting of hydrogen and a saturated alkyl group of one to six carbons, Y is selected from the group consisting of fluorine, chlorine and bromine and Q is selected from the group consisting of $F(CF_2)_nCH_2O_2C-$ and

wherein $n$ is an integer of from 3 to about 14.

5. A water dispersion of a composition according to claim 4.

References Cited by the Examiner

UNITED STATES PATENTS

| | | | |
|---|---|---|---|
| 2,318,429 | 5/1943 | Smith | 117—135.5 |
| 2,642,416 | 6/1953 | Ahlbrecht et al. | 260—86.1 |
| 2,681,324 | 6/1954 | Hochberg | 260—29.6 |
| 2,840,442 | 6/1958 | Abrams | 117—139.5 |

MURRAY TILLMAN, *Primary Examiner.*

LEON J. BERCOVITZ, SAMUEL H. BLECH,
                                  *Examiners.*

H. L. SATZ, M. J. BRIGGS, SR., *Assistant Examiners.*

UNITED STATES PATENT OFFICE
CERTIFICATE OF CORRECTION

Patent No. 3,256,230                  June 14, 1966

Rulon Edward Johnson, Jr., et al.

It is hereby certified that error appears in the above numbered patent requiring correction and that the said Letters Patent should read as corrected below.

Column 13, line 27 before "1,3-butadiene" insert -- $CH_2=C\ R'\ CONHCH_2OH$ --; column 14, line 21, after "from" insert -- the group consisting of --.

Signed and sealed this 5th day of September 1967.

(SEAL)
Attest:

ERNEST W. SWIDER                 EDWARD J. BRENNER

Attesting Officer                Commissioner of Patents